United States Patent [19]

Friberg

[11] 4,361,000
[45] Nov. 30, 1982

[54] BAGGING FILAMENT MOWER

[75] Inventor: Nathan J. Friberg, Shakopee, Minn.

[73] Assignee: The Toro Company, Minneapolis, Minn.

[21] Appl. No.: 269,151

[22] Filed: Jun. 1, 1981

[51] Int. Cl.$^3$ ............................................. A01D 53/04
[52] U.S. Cl. ................................. 56/13.4; 56/12.7; 56/320.2
[58] Field of Search ................ 56/320.2, 12.7, 13.4, 56/320.1, 13.3

[56] References Cited

U.S. PATENT DOCUMENTS

| | | | |
|---|---|---|---|
| 2,953,887 | 9/1960 | Boesch, Jr. et al. | 56/13.4 |
| 2,953,888 | 9/1960 | Phillips, Jr. et al. | 56/13.4 |
| 3,541,771 | 11/1970 | Schulze | 56/320.2 |
| 3,680,295 | 8/1972 | Rutherford | 56/13.4 |
| 3,706,189 | 12/1972 | Rutherford | 56/13.4 |
| 3,790,094 | 2/1974 | Spicer | 56/13.3 |
| 3,905,181 | 2/1974 | Messnier | 56/13.4 |
| 4,087,955 | 5/1978 | Szymanis | 56/13.4 |
| 4,112,653 | 9/1978 | Ballas et al. | 56/12.7 |
| 4,235,068 | 11/1980 | Comer | 56/12.7 |
| 4,257,214 | 3/1981 | Ferguson et al. | 56/320.2 |

FOREIGN PATENT DOCUMENTS

223820 9/1958 Australia .......................... 56/13.4

Primary Examiner—Paul J. Hirsch
Attorney, Agent, or Firm—James W. Miller

[57] ABSTRACT

A bagging filament line lawn mower (2) has a filament line cutting element (8). A fan (60) located in a cutting chamber (26) in the housing (4) of mower (2) is shielded by an outer shroud wall (68). Shroud wall (68) and fan (60) are configured to create an airflow in the cutting chamber (26) over that portion of the grass traversed by the free end portion (47) of the cutting element (8). This airflow has both vertical and circumferential components to both lift the grass for more efficient cutting by the cutting element (8) and to transport the cut grass particles through the lawn mower housing (4) to a discharge outlet (34). Shroud wall (68) is sufficiently high and is spaced so that an operator during normal operation of mower (2) cannot interpose a body member into the fan path.

13 Claims, 4 Drawing Figures

BAGGING FILAMENT MOWER

TECHNICAL FIELD

This invention relates in general to a lawn mower for cutting vegetation such as grass, other types of lawn cover, or the like. More particularly, this invention concerns a lawn mower having a flexible line cutting element. Rotation of the cutting element rigidifies the cutting element sufficiently to allow it to sever grass or other types of vegetation.

DESCRIPTION OF THE PRIOR ART

Rotary lawn mowers having rigid steel cutting blades are well known. Such blades usually have two sharpened cutting edges each of which is backed by an upwardly directed sail. The cutting edges of the blade sever grass at predetermined heights above the ground when the blade is rotated by a suitable power source. The sails on the blade create a generally circumferential airflow in the lawn mower housing. The cut grass particles are transported to a bagging attachment secured to the housing by mechanical transport from impingement on the blade itself and by pneumatic transport resulting from the airflow which entrains the particles. This airflow also creates turbulence or agitation in the cutting chamber which oscillates the grass blades back and forth until they are eventually cut off in approximately vertical position.

Rotary lawn mowers of the type noted above are quite effective in cutting grass. However, the use of a rotating rigid steel blade can be somewhat dangerous. Such a blade when rotating can easily injure the operator if the operator should accidentally or inadvertently place a portion of his body into contact with the blade. While such accidents occur infrequently, they nonetheless do occur and pose a disadvantage to the use of rigid bladed lawn mowers.

Lawn mowers have been proposed in which the rigid cutting blade is replaced by a flexible line cutting element of the monofilament type. Such a line when rotated at sufficient speed is rigidified to allow the line to impact against and sever ground growing vegetation such as grass. However, the line is also sufficiently flexible so that even when rotating it will not substantially injure the operator. Thus, a filament line lawn mower is considerably safer in operation than is the conventional rigid bladed mower.

The cutting line of a filament line lawn mower is so light that it does not develop sufficient momentum to mechanically transport the cut grass particles. In addition, it would be very difficult to attach sails to the lines to create any type of airflow. Thus, the filament line lawn mower without more does not have the ability to agitate the uncut grass to stand the grass up for better cutting or to pneumatically transport the cut grass particles once they have been severed. These are both desirable features for a commercially acceptable lawn mower.

One type of proposed filament line lawn mower has attempted to solve these problems through the use of flexible sail members attached to the support member which carries the flexible cutting line. The sail members preferably extend out partially over the area of the ground traversed by the cutting line. The sail members when rotated create an airflow which both bags the cut grass particles and creates turbulence or agitation in the cutting chamber to oscillate the grass blades back and forth about their bases for better cutting. However, these sails are also sufficiently flexible so that they will not substantially injure the operator if he should place his hand or foot into contact with the sails. Such a bagging filament mower is disclosed in U.S. patent application Ser. No. 182,986, filed on Sept. 2, 1980, now U.S. Pat. No. 4,335,567 and assigned to the assignee of this invention.

While the use of flexible sails in the filament line lawn mower as noted above is effective in creating the needed airflow for grass transport, the sails themselves can pose difficult problems. Such sails should be as rigid as possible to create the best airflow, but also as light and flexible as possible so as not to injure the operator if the operator should come into contact with the sails. These are inconsistent design requirements making the proper design of the sails extremely difficult. Insofar as the sails are light enough to avoid substantial injury to the operator, the airflow created by the sails and the agitation of the grass might not be as good as would otherwise be desirable for the best quality of cut. Moreover, insofar as the flexible sails are replaced by rigid sails, the rigid sails then clearly pose a safety hazard inconsistent with the use of a flexible cutting line.

SUMMARY OF THE INVENTION

This invention relates to a filament line lawn mower having a means for bagging the cut grass particles and for creating a generally upward airflow in the cutting area of the cutting chamber to stand the grass up for better cutting by the filament line cutting element. This is accomplished by a means which is safe and from which the operator is protected from the possibility of injury.

An improved lawn mower for cutting grass or the like according to this invention comprises a housing having a downwardly facing cutting chamber. Means is provided for supporting the housing for movement over a ground surface. A flexible line cutting element has a free end portion contained in the cutting chamber. This free end portion traverses over a cutting area of the chamber to sever grass at a predetermined height above the ground. Means is provided for rotating the free end portion of the cutting element. In addition, the lawn mower comprises a means for creating in at least a portion of the cutting area of the cutting chamber a generally circumferential and upwardly directed airflow which airflow stands the grass up for better cutting by the flexible line cutting element and also circumferentially moves the cut grass particles through the lawn mower housing. One important aspect of this invention relates to an airflow generating means that comprises a bladed fan having means for preventing the operator from interposing a body member into the fan during normal operation of the mower. This preserves the enhanced safety aspects of a filament line lawn mower.

Another aspect of this invention relates to a filament line lawn mower having a housing which carries a flexible line cutting element having a free end portion. The free end portion may be swung in a cutting plane over an area of the ground to sever vegetation. Means is provided for rotating the free end portion of the cutting element. Means is also provided for inducing an airflow in the housing which airflow has both upward and circumferential components which respectively stand the vegetation up for better cutting and transport the cut vegetation particles through the housing. The airflow inducing means is configured so that the upward airflow component is greatest at a first location in the housing and the circumferential airflow component is greatest at a second location in the housing downstream from the first location in the direction of rotation of the free end portion. This changes the nature of the airflow so that the airflow is most effective at the first location for standing the grass up and is most effective at the second location for transporting the cut grass particles.

BRIEF DESCRIPTION OF THE DRAWINGS

The present invention will be described in more detail in the following Detailed Description, when taken in conjunction with the following drawings, in which like reference numerals refers to like elements throughout.

DETAILED DESCRIPTION

Figure 1:
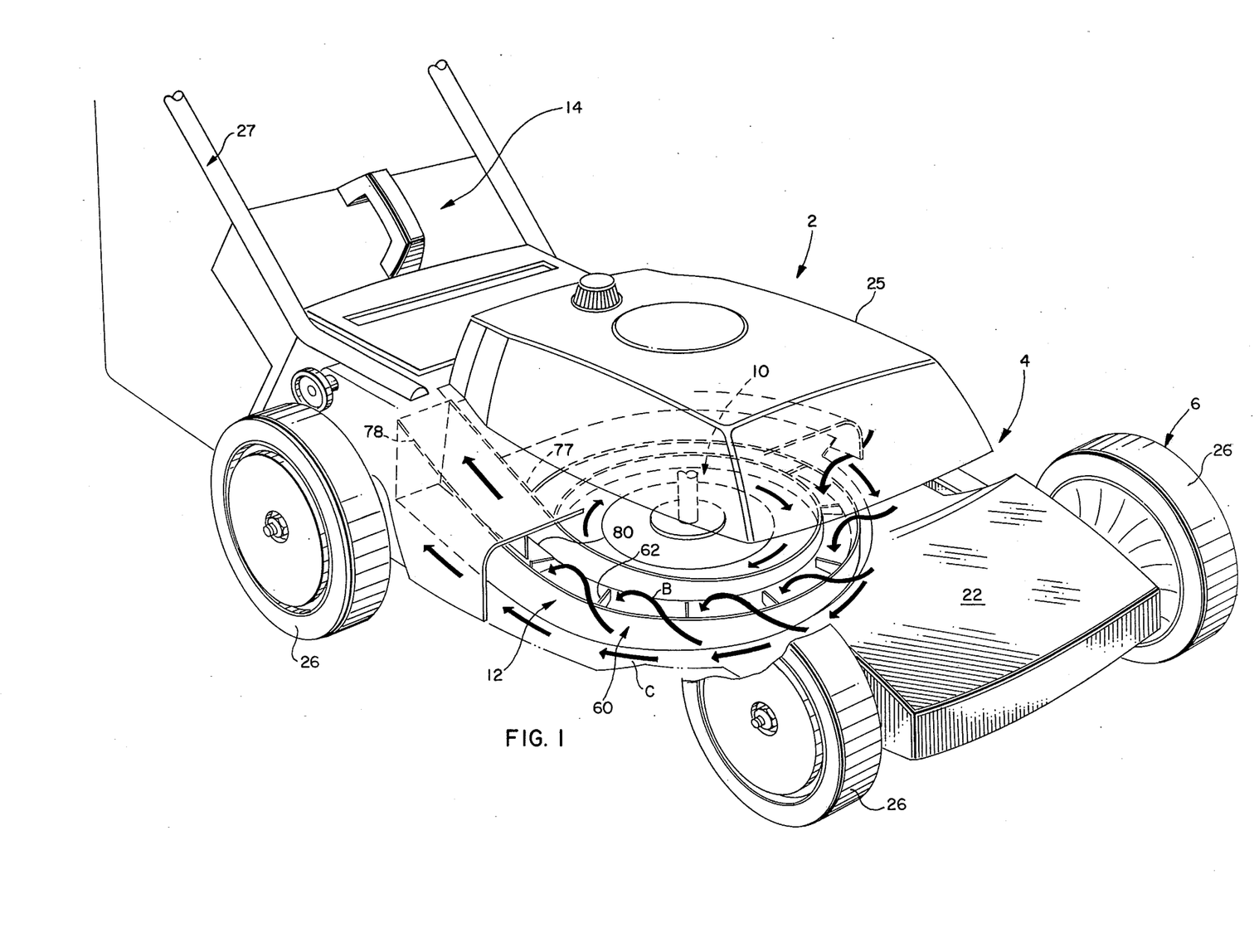
FIG. 1 is a perspective view of an improved filament line lawn mower according to the present invention, particularly illustrating the shrouded fan used for generating lift on the uncut grass and for transport of the cut grass particles.

Referring first to FIG. 1, an improved lawn mower according to a first embodiment of this invention is generally illustrated as 2. Lawn mower 2 comprises a number of interrelated components. Each of the components will be described in detail hereafter insofar as is necessary for an understanding of the present invention. However, by way of introduction, lawn mower 2 comprises a housing 4, support means 6 for movably supporting housing 4 above the ground, a flexible line cutting element 8 for severing or cutting grass at a predetermined height above the ground (see FIG. 2), motor or power means 10 for powering cutting element 8, means 12 for inducing an airflow in housing 4 for standing the uncut grass up to be severed by the cutting element and for causing the cut grass particles to be carried to a discharge outlet in the housing, and a grass collector 14 for receiving and storing the particles of cut grass which have been severed by cutting element 8.

Figure 4:
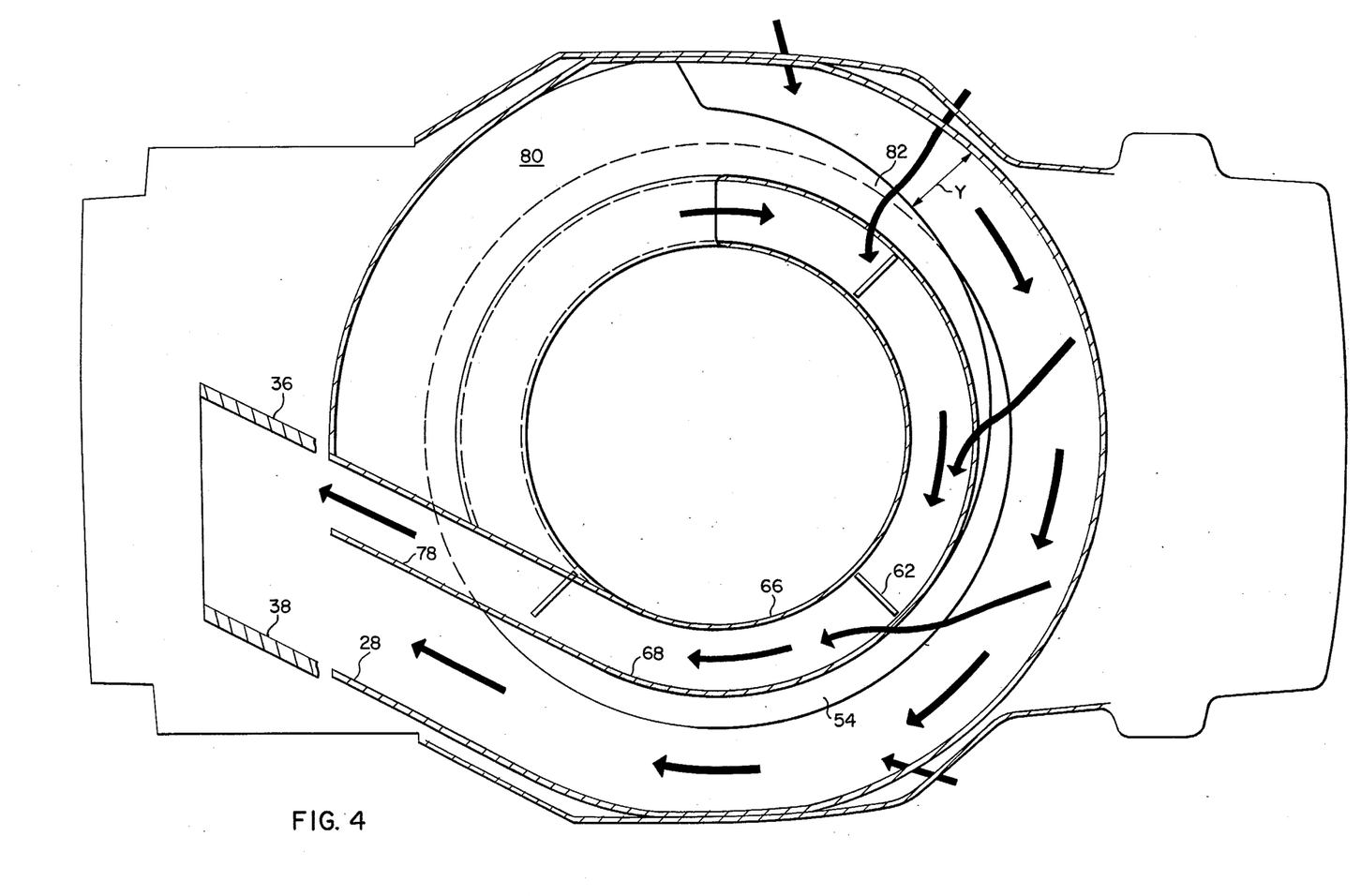
FIG. 4 is a cross-sectional view similar to that of FIG. 3, particularly illustrating a second embodiment of a shrouded fan configuration for an improved filament line lawn mower according to this invention.

Lawn mower 2 is primarily intended for cutting grass or any other vegetation suitable for use as ground cover. However, the type of vegetation being cut by lawn mower 2 is not an important feature of the present invention as long as it can, in fact, be properly cut by cutting element 8. Thus, the term "grass" as used herein is not meant to limit the present invention. An Additional embodiment of an improved lawn mower according to this invention will be described with regard to FIG. 4. Many of the features of this additional embodiment are the same as those in lawn mower 2. Thus, the first embodiment for the lawn mower, i.e. lawn mower 2, will be described in detail. Then, specific differences between the other embodiment of the lawn mower and lawn mower 2 will be pointed out in a specific description of the other embodiment.

THE HOUSING AND THE SUPPORT MEANS

Figure 3:
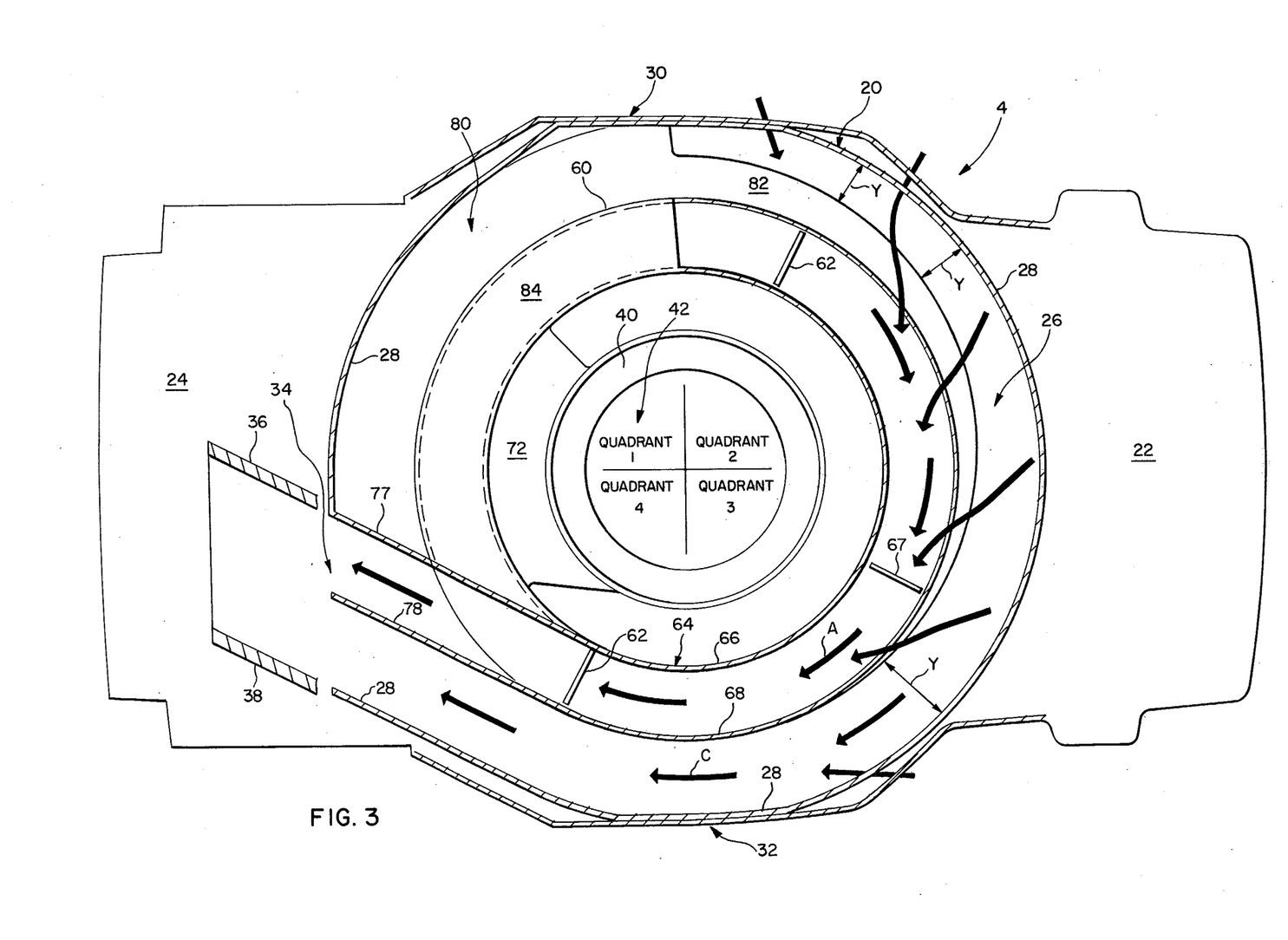
FIG. 3 is a cross-sectional view through the lawn mower of FIG. 1 from a point immediately above the shrouded fan, particularly illustrating a first embodiment of the shrouded fan.

Housing 4 is a generally conventional lawn mower housing of the type normally used for rigid bladed mowers. Referring to FIG. 3, housing 4 comprises a generally circular central deck 20 located between outwardly extending front and rear decks 22 and 24 respectively. Power source 10 is mounted to the top of central deck 20 and is covered by a protective cover 25 (see FIG. 1). Housing 4 is preferably cast in one piece or otherwise integrally made from a rigid material, such as steel, aluminum or reinforced plastic.

A plurality of rotatable wheels 26 are secured to the front and rear decks 22 and 24 at the corners thereof to support housing 4 for movement over the ground. A handle assembly 27 extends upwardly from rear deck 24 to allow the operator to push lawn mower 2 over the ground. Some of wheels 26 may be self-propelled to assist the operator in moving the lawn mower over the ground. Wheels 26 may also be secured to housing 4 by any suitable mechanism that would adjust the height of the housing relative to the wheel axles to vary the height of cut. In addition, wheels 26 form only one possible type of support means for moveably supporting housing 4. Any other type of suitable support means could also be used.

The exact shape of housing 4 is not critical to the present invention except insofar as housing 4 includes a downwardly facing (i.e. a ground facing) cutting chamber in which the cutting element 8 is rotated. Referring to FIG. 3, this cutting chamber, which is illustrated as 26, is basically defined by the area beneath central deck 20. As noted previously, central deck 20 is substantially circular and is defined by the area inside a generally circular downwardly depending peripheral wall 28 which wall 28 marks the outer boundary of central deck 20. A top wall or top surface 30 forms the top of central deck 20 and is integrally formed with peripheral wall 28. In effect, the cutting chamber 26 is substantially enclosed except for being open at the bottom adjacent the lower edge of peripheral wall 28. Thus, any air entering cutting chamber 26 has to come through the bottom thereof.

Peripheral wall 28 is not perfectly circular as is evident in FIG. 3. Wall 28 is truncated on each side of housing 4 to form flat left and right sides 30 and 32. Cutting element 8 extends during rotation beyond the sides 30 and 32 for constant trimming. However, wall 28 could be circular so that sides 30 and 32 are rounded and continuously enclose cutting element 8 without detracting from the novel features of this invention. In addition, looking down at the housing configuration shown in FIG. 3 with front deck 22 towards the front, one can imagine the circular area defined by cutting chamber 26 as being divided into four pie-shaped quadrants numbered 1, 2, 3, 4. Proceeding clockwise, quadrant 1 is the top left quadrant, quadrant 2 is the top right quadrant, etc. Peripheral wall 28 is broken in quadrant 3, i.e. the lower right quadrant, by a grass discharge outlet 34 for cutting chamber 6. Vertical walls 36 and 38, which are a portion of the grass chute of grass collector 14, extend outwardly from and mate with grass discharge outlet 34 to form a grass discharge ramp or passageway in rear deck 24 that conducts grass clippings into collector 14.

THE POWER SOURCE

Power source 10 comprises any suitable engine such as an internal combustion engine, either two-cycle or four-cycle, or an electric motor. As noted previously, power source 10 is supported on top of the top wall 30 of central deck 20. For this purpose, central deck 20 includes a reinforced circular hub or mounting ring 40 to which power source 10 is bolted or otherwise suitably secured. Hub 40 includes a central opening 42 through which the rotatable drive shaft 44 of power source 10 extends. Air does not enter cutting chamber 26 through opening 42 since power source 10 seals off opening 42. Drive shaft 44 extends down sufficiently far so that its lower end is located in cutting chamber 26 to be secured to the cutting element 8.

THE CUTTING ELEMENT

Figures 2, 5:
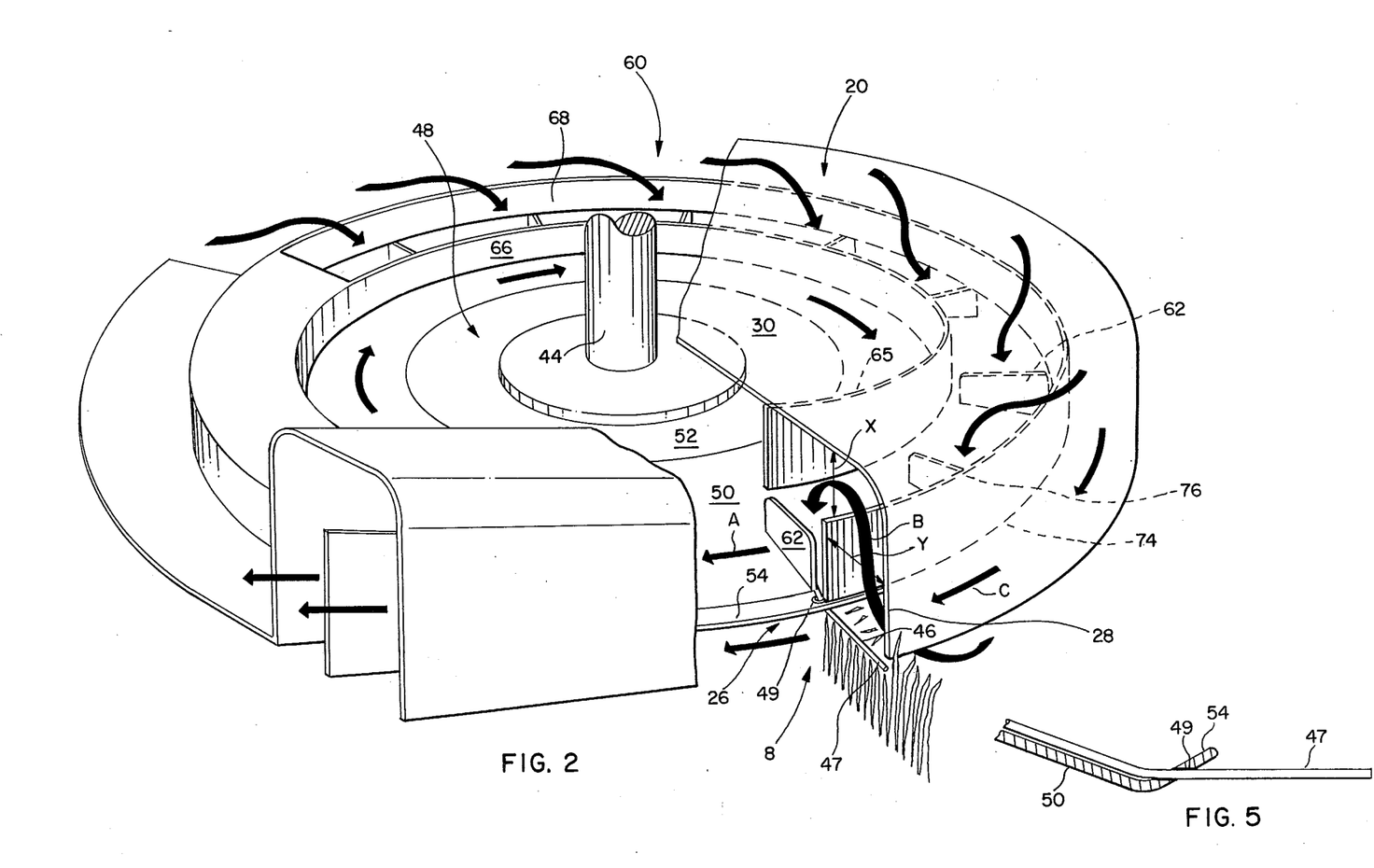
FIG. 2 is an enlarged perspective view of the shrouded fan shown in FIG. 1 particularly illustrating the grass lifting and transporting functions.
FIG. 5 is a partial cross-sectional view of the filament line and support member therefor.

Referring now to FIG. 2, cutting element 8 comprises at least one flexible line 46 supported for rotation in cutting chamber 26. A suitable support means is provided for supporting cutting line 46. This support means includes a frusto-conical support member 48 having a downwardly sloping conical surface 50, an upper flat surface 52 suitably secured to drive shaft 44, and an upwardly angled, outwardly extending lower lip 54. See FIG. 5. Cutting line 46 is rigidly secured to the support member by securing one end to support member 48 and by passing line 46 out through a grommet or support passage 49 in member 48. Line 46 extends out through lip 54 with grommet 49 and lip 54 serving to support the free end portion of the cutting line 46, i.e. the portion extending radially outwardly from suport member 48, from deflecting up out of the cutting plane. The free end portion of the cutting line is illustrated as 47.

While only one cutting line 46 has been illustrated in this embodiment, any number of such lines could be attached to the support member 48. In addition, any suitable mechanism could be provided on member 48 for carrying a supply of the flexible line on a spool for indexing additional line out into the cutting plane should the free end portion 47 wear down or become broken. Cutting element 46 preferably comprises a plastic monofilament line of the type used in hand-held grass trimmers or similar products. However, any flexible line could be used for cutting element 46 as long as such a line would rigidify sufficiently when rotated to sever grass or the like. Thus, the exact type of cutting line used and its manner of attachment to support member 48 is not critical to the present invention.

THE AIRFLOW GENERATING MEANS

A central part of this invention is the use of a means in cutting chamber 26 to create a generally circumferential and upwardly directed airflow in at least a portion of the area traversed by free end portion 47. This airflow stands the grass up for better cutting by free end portion 47. It also transports cut grass particles through the grass discharge outlet 34. However, an important requirement of such a means is that it not detract from the otherwise safe characteristics of the flexible line 46.

The preferred airflow generating means of this invention comprises a bladed fan and is generally illustrated as 60. Fan 60 comprises a plurality of fan blades or vanes 62 fixedly secured to conical surface 50 of the support member 48. Any number of blades 62 could be used, but preferably a relatively large number is employed, e.g. 6 to 12 blades. Blades are relatively rigid, being made preferably from a plastic or metallic material, and are preferably integrally molded on support member 48. While straight radially extending blades 62 have been illustrated in FIGS. 1-3, other shapes of the blades could also be used, namely radially curved blades having a forwardly cupped cross-sectional configuration.

Another important element of the airflow generating means is a double walled shroud 64 in which blades 62 are contained and rotate. Shroud 64 comprises a generally circular inner wall 66 and a generally circular outer wall 68 having a greater diameter than wall 66. Shroud walls 66 and 68 are integrally joined together as a unit by the walls 77 and 84 extending between the two. In addition, shroud 64 is fixedly supported inside cutting chamber 26 by a horizontal support bracket or flange 72 extending between hub 40 and a portion of inner shroud wall 66. This supports shroud 64 in a cantilever fashion inside cutting chamber 26. Any other means of fixing shroud 64 in chamber 26 could be used although horizontal support members, like bracket 72, are preferred over vertical support members since cut grass particles can catch or "hairpin" on vertical support members much more easily than on horizontal members. Horizontal support members are thus less prone to clogging with cut grass particles.

The inner and outer shroud walls 66 and 68 are radially spaced apart a distance slightly greater than the length of blades 62. In addition, referring to FIG. 2, outer shroud wall 68 is vertically positioned such that its lower edge 74 lies immediately above the horizontal rim 54 of support member 48. Support member 48 in effect closes off the bottom of shroud 64 and keeps an operator from sticking a body member up into contact with fan blades 62 from beneath the shroud 64. The gap between rim 54 and the lower edge 74 of shroud wall 68 is kept as small as engineering tolerances will allow so that this gap does not serve to feed air into fan 64.

In addition, the upper edge 76 of shroud wall 68 is vertically spaced by a gap or distance X beneath the top wall 30 of the central deck 20. It is not necessary for the upper edge of the inner shroud wall 66 to be so positioned and, in fact, the upper edge 65 of the inner shroud wall 66 extends all the way to the top wall 30. However, the distance X between the upper edge 76 of the outer shroud wall 68 is important in this invention and forms an air ingress means to fan 64. In addition, there is a radial distance Y between the outer shroud wall 68 and the peripheral wall 28 of central deck 20. This radial distance Y defines a cutting area in the cutting chamber in which the free end portion 47 of the cutting element is effective to sever grass or other ground growing vegetation.

Referring now to FIGS. 1 and 2, it is also apparent that the inner and outer shroud walls 66 and 68 are not entirely circular. Both of the shroud walls 66 and 68 have vertical rearwardly extending portions 77 and 78 which extend back as far as the grass discharge outlet 34. The portion 77 of shroud wall 66 is stepped up as at 80 to let the blades 62 pass beneath the step 80 during their rotation. The rearwardly extending portion 78 of the outer shroud wall 68 is positioned midway between the wall 77 and a rearmost portion of the peripheral wall 28. The distance between the walls 77 and 28 at their termination defines the grass discharge outlet 34. Walls 77 and 28 are abutted against and mated with the walls 36 and 38, respectively, of the grass discharge chute at the location of discharge outlet 34. The space between the wall portions 77 and 78 forms an air egress means or air discharge path for fan 64.

The area between the peripheral wall 28 and the outer shroud wall 68 defines as noted previously the cutting area in which the free end portion 47 of the cutting line is effective. A baffle 80 is mounted in this area and blocks off this cutting area in the fourth quadrant of the cutting chamber 26. Baffle 80 may be rigidly affixed to outer shroud wall 68 adjacent its lower edge and extends outwardly until it abuts against peripheral wall 28. Or, alternatively, baffle 80 could be fixed to wall 28 and abut against shroud wall 68.

Baffle 80 also has a tapering forwardly extending section 82 which extends out into the first and second quadrants of the cutting chamber. This forwardly extending section 82 effectively defines in the first and second quadrants an effective cutting area Y of gradually increasing radial depth. By the time the forwardly extending section 82 has ended, the cutting area Y has a radial depth equal to the entire distance between the outer shroud wall 68 and the peripheral wall 28. In addition, a baffle 84 extends between the inner and outer shroud walls 66 and 68 over the top thereof to close off this space in the fourth quadrant of the cutting chamber. Baffle 84 thus mimics the shape of the baffle 80 up to the point where the tapering forward section 82 begins. Baffle 84 also helps unite shroud walls 66 and 68 together.

The Grass Catching Assembly

A grass catching assembly 14 of any conventional type is preferably releasably coupled to the rear deck of housing 24. Grass catching assembly 14 has a mouth which mates with the grass discharge passageway defined between the discharge walls 36 and 38. Grass particles propelled through this passageway will be thrown into the assembly 14. When assembly 14 is full, it can be removed from lawn mower 2 and emptied. Preferably, a pivotal door on the lawn mower closes the grass discharge passageway whenever assembly 14 is not coupled to the housing. This door when raised can engage against a chute on assembly 14 to hold assembly 14 in place on housing 4. However, a lawn mower could be designed for use without a grass catching assembly 14 in which case the discharge passageway will be formed to direct the cut grass particles down into the grass away from the operator.

THE OPERATION OF LAWN MOWER 2

Most of the novel features relating to lawn mower 2 arise because of the provision of the shrouded fan 60. Referring to FIG. 3, the rotation of fan blades 62 between the inner and outer shroud walls 66 and 68 creates a generally circumferential airflow in this space represented by the arrows A. However, the only air for supplying the fan must come from the area outside the outer shroud wall 68 since the fan 60 is closed at its bottom by support member 48. Thus, an airflow is also induced in the cutting area which airflow is generally circumferential and upwardly directed. In other words, the air in the cutting area Y between shroud wall 68 and housing wall 28 is drawn circumferentially and then upwardly over the upper edge 76 of the shroud wall 68 to enter into the fan 60. This upward and circumferential movement of the air is represented by the arrows B and C in FIGS. 1 and 3.

The upward component B of the airflow is important since it helps stand the grass up for better cutting. Thus, the grass can be severed more cleanly by the flexible line cutting element 8 as line 46 is rotated sufficiently fast to rigidify the line and sever the grass. This lifting action on the grass ensures a better and more uniform quality of cut. The cut grass particles are then entrained in the circumferential component C of the airflow and carried back through the grass discharge passageway into the grass catching assembly 14. Some of the cut grass particles may also be carried by the upward component B so that they pass up over the shroud wall 68. These cut grass particles are, however, carried by the airflow A back into the grass catching assembly 14 since the air egress means for fan 64 discharges into assembly 14. The majority of the cut grass particles will travel in the cutting area Y between the shroud wall 68 and the peripheral wall 28. Only a minority of the particles will be lifted up over the shroud wall 68 into the fan 60 itself.

The use of a bladed fan 60 with rigid blades 62 is advantageous. It allows a fan action which by virtue of the provision of shroud wall 68 can have airflow components tailored to allow an upward and circumferential airflow. This airflow is important in terms of cutting and bagging the grass as noted earlier. Thus, a lawn mower 2 is provided which uses a filament line cutting element 8 and also effectively cuts and bags grass which is a necessary marketing feature.

In addition, the use of a shrouded fan 60 is important because it does not detract from the safety aspects of the filament line cutting element 8. When mower 2 is upright standing on its wheels 26, the upper edge 76 of outer shroud wall 68 is located sufficiently far from and above the lower edge of the housing wall 28 such that an operator cannot put his hand or foot up beneath the lower edge of the housing wall 28 and over the shroud wall into the fan 60. In other words, the outer shroud wall 68 serves as a barrier or shield which prevents the operator from getting any part of his body into contact with the rigid fan blades 62. The only rotating part of the device readily accessible to the operator when mower 2 is operating normally is the filament cutting line itself which is relatively safe. Thus, even though a rigid bladed fan has been used for the air generating movement, it does not pose a safety threat to the operator and is in keeping with the enhanced safety aspects of a filament line lawn mower.

Baffle 80 including its forwardly extending section 82 is also important in properly tailoring or creating an airflow for the best cutting and bagging of grass. When fan blades 62 pass beneath step 80 in the rearwardly extending portion 77 of inner shroud wall 66, they become somewhat starved for air. The use of baffle 80 along with the baffle 84 on the top of the fan shroud in the fourth quadrant of the cutting chamber prevents any air from reaching the fan blades 62 in the fourth quadrant. Instead, air can effectively reach the fan only at the beginning of the first quadrant where the forwardly extending section 82 is present and where baffle 84 is no longer in place. Thus, the baffle 80 forms a means for concentrating the airflow into the first and second quadrants of the cutting chamber which quadrants are adjacent the front half of mower housing 4. This is the area of the cutting chamber where cutting is traditionally done since it is the area which is first moved over uncut grass.

In addition, the use of a radially tapering forwardly extending section 82 of baffle 80 is important. This section creates a cutting area Y of gradually increasing radial depth. The cutting area Y has its minimum depth at the very beginning of the first quadrant and has a maximum depth in or near the end of the second quadrant where the section 82 has tapered to nothing. Because the cutting area Y has a restricted radial depth at the beginning of the first quadrant, the airflow passing therethrough will have a greater upward component B and a lesser circumferential component C. As one proceeds from the first through the second quadrant, the upward component B of the airflow gradually decreases as the cutting area Y widens and the circumferential component C of the airflow gradually increases. Thus, the forwardly extending section 82 of baffle 80 forms a means for changing the strength of the airflow components even though the total energy in the airflow may be the same. At the beginning of the first quadrant the airflow is most effective in standing the grass up for good cutting since the vertical component B of the airflow is greatest at that point. As one proceeds around the cutting area in the first and second quadrants, the airflow changes to one which is more effective in transporting the cut grass particles. This is desirable since many of the grass particles have already been cut and it is necessary in these areas to simply transport the particles. Accordingly, the shrouded fan of this invention is particularly effective in having a precisely tailored airflow which changes the nature and strength to some degree to accomplish different functions.

THE EMBODIMENT OF FIG. 4

The lawn mower illustrated in FIGS. 1-3 is one embodiment which effectively cuts grass under a wide variety of conditions. However, when cutting extremely wet succulent grass, applicant has found that grass sometimes has a tendency to clog in the grass discharge passageway between the grass discharge walls 36 and 38, and particularly between the walls 38 and 78, since the flow of cut grass particles is by far the heaviest in the grass carrying channel outside fan 60. It was thought that this resulted from an opening between walls 38 and 78 which was too narrow. Therefore, in FIG. 4, an alternative shroud configuration is illustrated for the lawn mower 2. In this embodiment, the shrouded fan 60 has been made smaller with outer shroud wall 68 being radially spaced inwardly relative to lip 54 of the support member 48 and the peripheral wall 28. This effectively increases the distance between the walls 28 and 78 in the grass discharge passageway to increase grass carrying capacity in the outer channel even though grass discharge opening 34 is still the same size. This alleviates much of the grass clogging problem. As an adjunct to this approach, the forwardly tapering section 82 of baffle 80 ends closer to the beginning of the first quadrant than is the case in the embodiment of FIG. 3. This converts the circumferential component C of the airflow to its greatest value at a somewhat earlier point in the movement of grass through the cutting area Y to more effectively transport the cut grass particles, which also tends to alleviate the grass clogging problem.

Another approach to the grass clogging problem would be to precisely regulate the distance from the top edge 76 of the outer shroud wall 68 to the top wall 30 of the central deck 20 so that a sufficient volume of air is flowing through the grass discharge outlet 34 and between walls 38 and 78 to prevent clogging. In both the first and second embodiments, various values for this distance were used. In one example, the distance between the top edge 76 of outer shroud wall 68 and top wall 30 of the central deck 20 was kept a constant, meaning that the height of the outer shroud wall 68 increased because the top wall 30 of the central deck 20 in a conventional mower housing 4 rises as one moves from the first through the third quadrants. In other examples, the height of the outer shroud wall 68 was kept constant meaning that the distance between the top edge 76 of the shroud wall 68 and the top wall 30 of the central deck 20 gradually increased. It has been found that the most optimum solution is a shroud wall located in between these two examples, i.e. a shroud wall where the distance between the top edge 76 of outer shroud wall 68 and the top wall 30 is not constant but which does not increase as much as in the case where the shroud wall 68 is a constant height, so that the shroud wall does increase somewhat in height from the first to the third quadrants. One effective form of the invention utilized a beginning distance of 1¼ inches between the top edge 76 of shroud wall 68 and the top wall 30 with this distance gradually increasing to 1¾ to 2 inches adjacent the discharge outlet 34.

Various modifications of this invention will be apparent to those skilled in the art. Thus, the scope of this invention is to be limited only by the appended claims.

I claim:

1. An improved lawn mower for cutting ground growing vegetation, which comprises:
   (a) a housing having a downwardly facing cutting chamber, wherein the cutting chamber has a lower edge and is substantially enclosed except for being open at its bottom such that air is drawn into the cutting chamber substantially only through its bottom;
   (b) means for supporting the housing for movement over a ground surface;
   (c) a flexible line cutting element having a free end portion contained in the cutting chamber which portion traverses over a cutting area of the chamber to sever the vegetation;
   (d) means for rotating the free end portion of the cutting element; and
   (e) means for inducing a generally upward airflow in at least a portion of the cutting area traversed by the free end portion of the cutting element to stand the vegetation up for better cutting, wherein the inducing means comprises a fan located in the cutting chamber and having means for preventing the operator from interposing a body member into the fan during normal operation of the lawn mower, wherein the fan comprises:
      (i) at least one rotatable fan blade; and
      (ii) a shroud for enclosing the fan blade, wherein the shroud is substantially enclosed except for air ingress means for feeding air to the fan blade and air egress means for discharging air from the shroud, and wherein the shroud is located above the lower edge of the cutting chamber such that the air drawn through the bottom of the cutting chamber has to move vertically upwardly to enter the air ingress means thereby forming the upward airflow in the cutting chamber.

2. An improved lawn mower as recited in claim 1, wherein the fan blades are relatively rigid.

3. An improved lawn mower as recited in claim 1, wherein the air ingress means is located sufficiently far above the lower edge of the cutting chamber such that an operator is not able to place a body member beneath the lower edge of the housing and through the air ingress means to gain access to the fan blade.

4. An improved lawn mower as recited in claim 3, wherein the air ingress means is defined by a gap between an upper edge of the shroud and a top surface of the cutting chamber.

5. An improved lawn mower as recited in claim 1, wherein the fan further includes a rotatable support member on which the fan blade is mounted, and wherein the shroud includes an annular shell enclosing the support member with the support member substantially closing the bottom of the shell.

6. An improved lawn mower as recited in claim 5, wherein the flexible line cutting element is carried by the rotatable support member, and wherein the free end portion of the cutting element extends out from the support member adjacent the bottom of the shell.

7. An improved lawn mower as recited in claim 1, wherein the cutting chamber is defined by the area inside a peripheral wall of the housing, wherein the shroud is located inside the peripheral wall with the area between the peripheral wall and the shroud defining the cutting area, and wherein the free end portion of the cutting element is operative only in the cutting area to cut vegetation.

8. An improved lawn mower as recited in claim 1, wherein the fan is located in the cutting chamber so that the airflow also travels generally circumferentially through a portion of the cutting area to transport cut particles through the cutting area.

9. An improved lawn mower as recited in claim 8, wherein the housing includes a discharge passageway for the cutting chamber through which the cut particles are discharged by the airflow.

10. An improved lawn mower as recited in claims 1 or 8, wherein the cutting chamber of the housing is divided into four quadrants with the first quadrant being the left front quarter of the cutting chamber and the other quadrants proceeding in order clockwise therefrom, and further including means for concentrating the airflow in the first two quadrants and a portion of the third quadrant.

11. An improved lawn mower as recited in claim 10, wherein the concentrating means comprises a baffle mounted in the cutting area which baffle is shaped to cut off the airflow, substantially completely in a fourth quadrant of the cutting area.

12. An improved lawn mowing device for cutting ground growing vegetation, which comprises:
(a) a housing having a downwardly facing cutting chamber defined by the area inside a peripheral wall of the housing, and further including a discharge outlet communicating with the peripheral wall through which cut vegetation particles are discharged;
(b) means for inducing an airflow in the cutting chamber which airflow has both upward and circumferential components which respectively stand the vegetation up for better cutting and transport the cut vegetation particles through the cutting chamber to the discharge outlet, wherein the airflow inducing means comprises a rotatable fan positioned inside a stationary annular shroud located in the cutting chamber, wherein the annular shroud is located inside the peripheral wall of the cutting chamber so that the air drawn into the shroud comes from a cutting area beween the shroud and the peripheral wall with the airflow being induced in the cutting area, and wherein the cutting area gradually increases in depth from a first location to a second location downstream from the first location in the direction of rotation of the fan such that the upward airflow component gradually decreases and the circumferential airflow component gradually increases between the first and second locations so that the airflow becomes gradually more effective in transporting the cut particles to the discharge outlet;
(c) a flexible line cutting element carried on the housing, wherein the cutting element has a free end portion which is swung in a cutting plane over the cutting area between the shroud and the peripheral wall of the housing; and
(d) means for rotating the free end portion of the cutting element.

13. An improved lawn mowing device as recited in claim 12, wherein the housing comprises a wheeled chassis suited for rolling over the ground.

* * * * *